United States Patent

Fisher et al.

[15] 3,657,006

[45] Apr. 18, 1972

[54] METHOD AND APPARATUS FOR DEPOSITING DOPED AND UNDOPED GLASSY CHALCOGENIDE FILMS AT SUBSTANTIALLY ATMOSPHERIC PRESSURE

[72] Inventors: Peter D. Fisher, 3325 St. Paul Street, Baltimore, Md. 21218; James C. Word, IV, 8325 E. Columbus Ave., Scottsdale, Ariz. 85251; Haden J. Bourg, Jr., 199 Plymouth Lane, Apt. B, Glen Burnie, Md. 21061

[22] Filed: Nov. 6, 1969

[21] Appl. No.: 874,646

[52] U.S. Cl. .............................117/201, 117/106 R, 118/48
[51] Int. Cl. ..........................................................C23c 13/04
[58] Field of Search .......................117/201, 106; 252/62.3 S

[56] References Cited

UNITED STATES PATENTS 3,390,090 6/1968 Taylor et al...........................252/62.3
3,424,610 1/1969 Forgue..................................117/201

*Primary Examiner*—Ralph S. Kendall
*Attorney*—F. H. Henson and E. P. Klipfel

[57] ABSTRACT

Glassy chalcogenide films like copper-doped arsenic selenide, useful in vidicons and amorphous, current-controlled switches and hitherto obtainable only through time-consuming vacuum-deposition techniques, are obtained by heating and reacting in an open tube a first compound (arsine, stibine, phosphine, or the like) with a second compound (hydrogen selenide, hydrogen sulfide, or the like). Hydrogen gas is preferably used as a flush gas, and the dopant is preferably supplied in vapor form so that the amount thereof in the film can be readily controlled.

7 Claims, 2 Drawing Figures

PATENTED APR 18 1972 3,657,006

INVENTORS.
PETER D. FISHER,
JAMES C. WORD IV,
HADEN J. BOURG, Jr.
By Ernest S. Kettelle
Attorney

METHOD AND APPARATUS FOR DEPOSITING DOPED AND UNDOPED GLASSY CHALCOGENIDE FILMS AT SUBSTANTIALLY ATMOSPHERIC PRESSURE

BACKGROUND OF THE INVENTION

1. Field of the Invention

This invention relates to methods and apparatus for depositing chalcogenide films.

2. Description of the Prior Art

The properties of glassy chalcogenide films, such as arsenic triselenide, undoped or doped with various dopants such as silicon, germanium, tin, or copper, are known. These properties suggest that such films will serve many useful purposes, once obtained. Pure arsenic triselenide in amorphous film form has been used as the photoconductive element in vidicon and permachon camera tubes; it responds to visible radiation with a photoresponse time of about 1 millisecond. The same compound, doped with silicon, germanium, or tin, has a very much longer photoresponse time, up to about 15 minutes. Films with long photoresponse times are useful as integrators of weak light signals or as storage elements. When doped with copper, the arsenic triselenide becomes sensitive to infrared radiation. Similar statements can be made concerning the properties of other glassy chalcogenide compounds such as arsenic tritelluride, antimony tritelluride, antimony triselenide, etc. Other applications of the chalcogenide films based upon their piezoelectric, luminescent, or reversible-electric-switching properties, are also known.

The prior art method of producing glassy chalcogenides is time-consuming (requiring about 5 to 6 hours), and the control of the dopant concentration with methods known prior to this invention is poor.

The prior art method of producing films of glassy chalcogenides involves deposition in a vacuum. Because of the time required for evacuating the system and the slow rate at which the films are deposited, the total time for one complete deposition cycle is on the order of 5 to 6 hours.

Moreover, when the film is made in this manner, it is difficult to obtain doping of the film that is of satisfactory uniformity and desired concentration. Copper has been added to arsenic triselenide, for example, only by using an evacuated bomb. In addition to the usual difficulties that go with working with a bomb, there is the drawback that there is no way of controlling adequately the amount of copper introduced into the arsenic triselenide film, and hence the peak or optimal infrared response frequency. Another cause of difficulty is that the amount of copper or other dopant added to the bomb is small and limited, becoming depleted as the deposition progresses, and this tends to cause non-uniformity.

The prior art method of doping an arsenic triselenide film with tin, germanium or silicon is to use the dopant metal or a suitable compound thereof as a substrate, i.e., deposit the film against $SnO_2$, Ge, or Si, and rely upon diffusion of the dopant from the substrate into the film.

BRIEF SUMMARY OF THE INVENTION

It has been discovered that arsenic triselenide films can be deposited on a suitable substrate in about 15 minutes at about atmospheric pressure by using the reaction.

$$2AsH_3 + 3H_2Se \rightarrow As_2Se_3\downarrow + 6H_2\downarrow$$

The reaction is done in an open-ended tube having a cool zone in which the deposition of the $As_2Se_3$ occurs. The vapor-phase atmospheric-pressure operation makes it possible to add the dopant in controlled quantities and with satisfactory uniformity — if dopant is used. The invention has obvious usefulness for the making of other doped or undoped glassy chalcogenide films, such as arsenic telluride, antimony selenide, antimony telluride, etc. in accordance with similar chemical reactions.

DESCRIPTION OF THE DRAWINGS

A complete understanding of the invention may be obtained from the foregoing and following description thereof, taken together with the appended drawings, in which.

DESCRIPTION OF THE PREFERRED EMBODIMENTS

Figure 1:
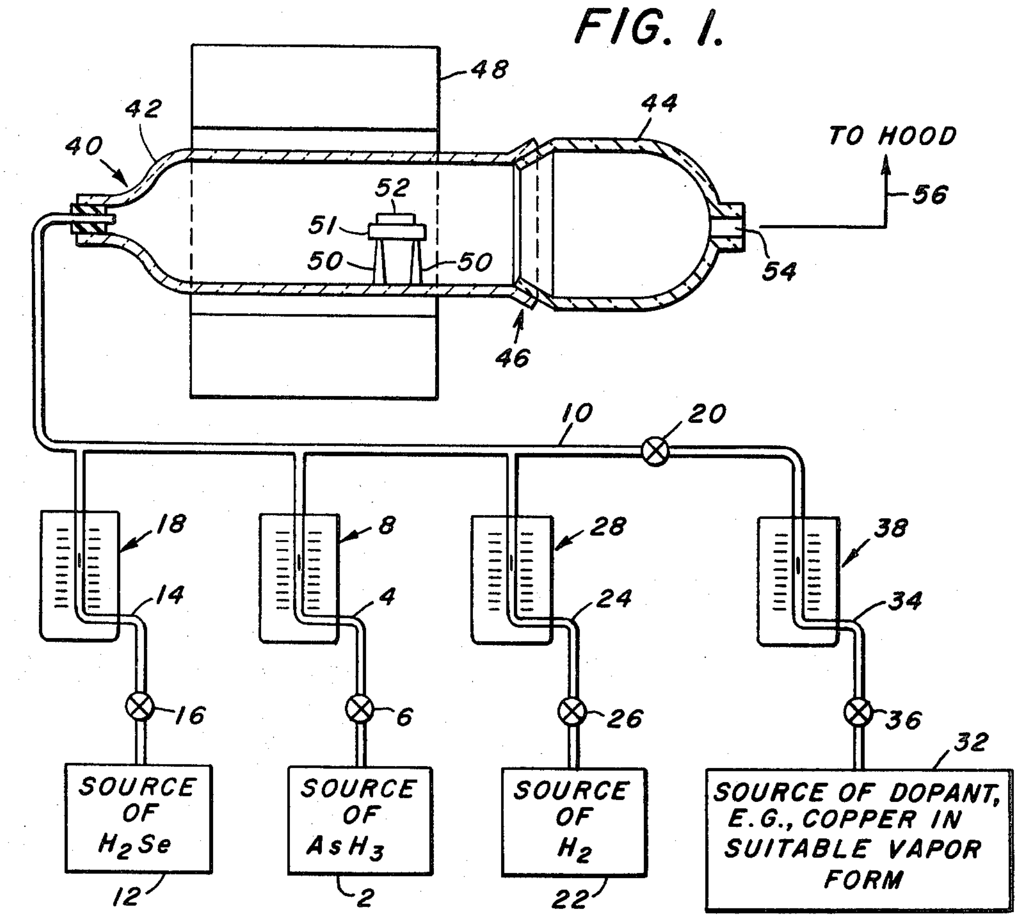
FIG. 1 is a representation, partly schematic, of apparatus of the invention, used in the practice of the method of the invention.

Referring to FIG. 1, there is indicated at 2 a source of arsine gas ($AsH_3$). This communicates by a line 4 containing a valve 6 and a flow-measuring means such as the rotameter 8 with a main 10.

There is indicated at 12 a source of hydrogen selenide gas. This communicates by a line 14 containing a valve 16 and a flow-measuring means such as the rotameter 18 with the main 10.

Indicated at 22 is a source of hydrogen gas. This communicates by a line 24 containing a valve 26 and a flow-measuring means such as the rotameter 28 with the main 10.

Indicated at 32 is a source of dopant in vapor form. This communicates by a line 34 containing a first valve 36, a second valve 20, and a flow-measuring means such as the rotameter 38 with the main 10. It should be emphasized that, although the impurity ultimately ends up in vapor form, it may be introduced as a gas, a liquid, or a solid. For example, if one wants to dope the film with silicon, the impurity is introduced as silane, $SiH_4$, which is a gas. If tin is the dopant, hydrogen is bubbled through liquid $SnCl_4$, and this combination is carried in vapor form into the chamber. If Cu is the desired impurity, HCl is blown by solid Cu, and the copper is picked up and carried into the chamber and mixed with the arsenic and selenium.

The main 10 leads to a vessel 40, which may be of quartz or the like and comprises a first or upstream part 42 and a second or downstream part 44, joined by a suitable gas-tight joint 46. Surrounding the vessel 40 is a heating means capable of generating temperatures suitable elevated, such as 800° C, this being indicated in FIG. 1 as comprising a resistance furnace 48.

Positioned within the vessel 40 in the vicinity of the downstream end thereof are suitable supports 50 for platform 51 for receiving substrate piece 52, upon which the desired film is to be grown. As those skilled in the art will appreciate, the piece 52 may be of suitable material such as has hitherto been used in the conventional "bomb" technique, i.e., glass, quartz, or evaporated gold on glass.

Figure 2:
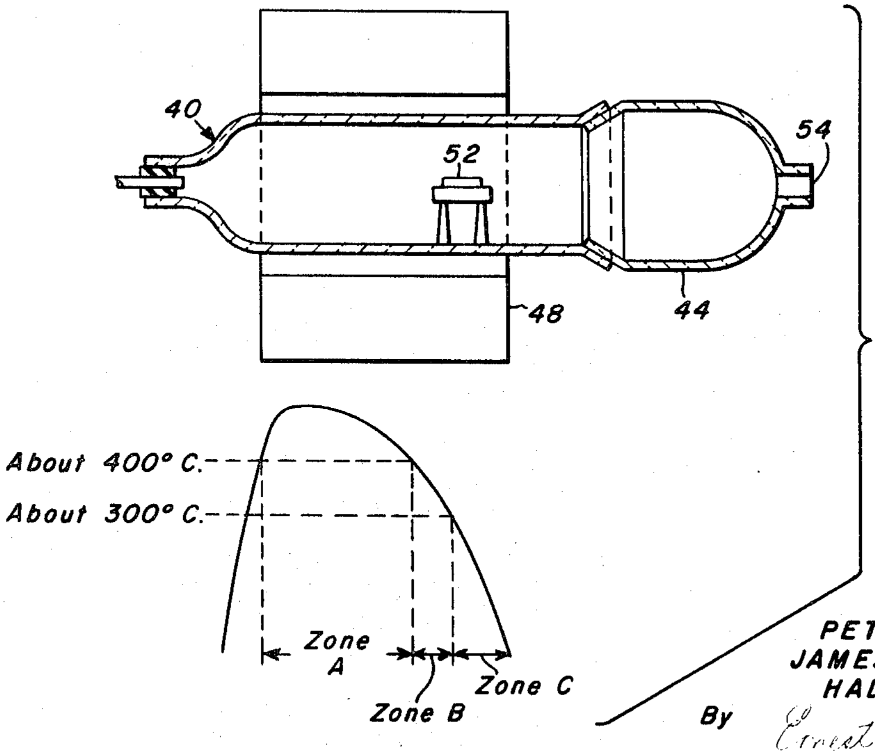
FIG. 2 is a diagram illustrating the temperature profile in the reaction tube or vessel.

As a result of the finite length the resistance furnace 48, there exists within the reaction tube or vessel 40, a temperature profile as shown in FIG. 2. This temperature profile is required in order to obtain deposition of the film. This temperature profile effectively apportions the reaction tube into three distinct zones.

ZONE A

Zone A is the region of the vessel 40 where the temperature exceeds approximately 400° C. Above this temperature, the arsine and hydrogen selenide decompose into arsenic, selenium and hydrogen.

ZONE B

Zone B is the region of the vessel 40 where the temperature is between roughly 300° C and 400° C. In this zone the arsenic and selenium combine to form $As_2Se_3$.

ZONE C

Zone C is the region of the vessel 40 where the temperature of the vessel is below roughly 300° C. In this zone the $As_2Se_3$ is deposited on the substrate, as well as on the walls of the vessel 40.

The part 44 of the vessel 40 has an exit port 54 that is preferably large enough to permit passage therethrough of a push rod (not shown). As indicated at 56, gases leaving the exit port 54 are removed to and through a hood (not shown).

The apparatus described above is operated as follows. With the portion 44 of the vessel 40 disassembled from the upstream part 42, a suitable substrate piece 52 is placed upon the platform 51. The portion 44 is then joined to the portion 42, and any final positioning that is required of the substrate piece 52 is done by using a push rod (not shown) inserted through the exit port 54. The hood (not shown) is activated, as is the furnace 48, and the valve 26 is turned so as to permit hydrogen to flow from the source 22 through the line 10 and thence through the vessel 40 as flush gas during the heating operation.

The heating requires only a few minutes. Then, the valves 6 and 16 are turned, so that arsine gas and hydrogen selenide gas are fed through the line 10 to the vessel 40. Usually, but not necessarily, the hydrogen flow rate is diminished at this time, by turning the valve 26. The arsine and the hydrogen selenide may be fed to the vessel 40 in the stoichiometric proportions.

As indicated above, there is established in the vessel 40 a thermal profile or gradient such that there are three distinct zones having different temperatures prevailing therein. Those skilled in the art will appreciate how it is possible to select appropriate flow rates of arsine and hydrogen selenide, considering the dimensions of vessel 40 and capacity of the furnace 48, such that a thermal profile or gradient ad described above is obtained. It is essential, of course, that the temperature in the first zone be high enough to cause the decomposition of the AsH, and the $H_2Se$, and it is also essential that the temperature in the third zone be low enough in the vicinity of the substrate piece 52 that the reaction product will be deposited thereon to form a glassy chalcogenide film.

It is possible to select flow rates such that there is deposited on the substrate piece 52 a film of desired thickness (about 2,000 to 10,000 A.) within a relatively short period of time, such as 5 to 50 minutes, and preferably 8 to 10 minutes.

Although for certain purposes, undoped films are satisfactory, there are other purposes for which glassy chalcogenide films doped with copper or other dopant material are required. For example, when doped with copper, arsenic triselenide films become sensitive to infrared radiation. Other dopants such as silicon, germanium or tin, have the effect of increasing the photoresponse time. When a dopant is used, it is desirable that the dopant become uniformly distributed in the film that is being made, so that the characteristics of the film will not vary form one portion to another thereof, and it is also desirable to be able to control the concentration of the dopant film, so that the shift in response time or activating-radiation wavelength may take place to the extent desired, neither more nor less. Prior art doping methods for these films have left much to be desired, but it has now been discovered that it is possible to obtain glassy chalcogenide films having a desired concentration of dopants uniformly distributed, by admitting the dopant in the form of one of its decomposable compounds in the vapor state to the stream of material passing through the line 10 and into the vessel 40. This is done by opening the valves 20 and 36 at an appropriate time in the process described above, such as the time that the valves 6 and 16 are opened.

Although the invention has been described above with reference to the making of arsenic triselenide films, it will be apparent to those skilled in the art that the invention is useful for the making of other glassy chalcogenide films such as arsenic tritelluride, antimony triselenide and antimony tritelluride. Stibine or phosphine may be used in place of arsine, and hydrogen sulfide or dimethyl telluride may be used in place of the hydrogen selenide.

The invention described above is illustrated by the following examples:

EXAMPLE I

An undoped film of arsenic triselenide was produced, using the conditions herein specified. A vessel having an inside diameter of 3.6 cm. and a length of 1,000 cm. had positioned in it a substrate piece 1 cm. by 2 cm., with a thickness sufficient to avoid interference when transmission measurements are performed (approximately the thickness of a microscope slide). The vessel was flushed for 5 minutes with a flow of hydrogen gas at the rate of 4,700 cubic centimeters per minute, following which the flow of hydrogen was stopped, and there were started flows of hydrogen selenide (42 cubic centimeters per minute) and arsine (5.9 cubic centimeters per minute). Heating was provided to yield in the vessel a temperature profile substantially corresponding to that in FIG. 2. The above-mentioned flows of hydrogen selenide and arsine were permitted to continue for 10 minutes and were then stopped. Heating of the vessel was also stopped. The hydrogen flush-gas flow was re-started for a few minutes, and the vessel was then purged with nitrogen during the cooling of the substrate piece. There was thus produced on the substrate piece a film of arsenic triselenide having a thickness of 3,000 A.

EXAMPLE II

A glassy chalcogenide film of arsenic triselenide doped with silicon was produced, using the conditions hereinafter specified. Example I was repeated, except that simultaneously with the starting of the flows of arsine and hydrogen selenide, there was also started a flow of silane (0.1 cubic centimeters per minute) which mixed with the other gases and entered the vessel. The results were the same (a uniform film 3,000 A. thick) but doped uniformly with silicon. An increase in the storage time of the chalcogenide film, e.g., from about 5 milliseconds to 9 milliseconds, was observed, this being attributable to the action of the silicon used as dopant.

The procedures indicated above have been found capable of yielding arsenic triselenide films that have good reproducibility (within 10 percent from run to run) in both thickness and As:Se ratio. Doping, when practiced, is uniform, and the time required, less than an hour, compares very favorably with the longer times, such as 5 to 6 hours, used in the bomb-deposition practices known prior to our invention.

While we have shown and described herein certain embodiments of our invention, we intend to cover as well any change or modification therein which may be made without departing from its spirit and scope.

We claim as our invention:

1. A method of making a film of material selected from the group consisting of the selenides and tellurides of arsenic and antimony, said method comprising the steps of reacting in an open-ended vessel at substantially atmospheric pressure a first substance consisting essentially of a compound composed of hydrogen and an element selected from the group consisting of selenium and tellerium with a second substance comprising a compound composed of hydrogen and an element selected from the group consisting of arsenic and antimony, to form a reaction product in the vapor phase causing said reaction product to become deposited on a substrate located in a downstream portion of said vessel to form said film.

2. A method as defined in claim 1, characterized in that said first and second substances are conducted while at about room temperature to said open-ended vessel at flow rates so metered as to yield a film having a thickness of about 2,000 to 10,000 A. in a time of about 5 to 50 minutes.

3. A method as defined in claim 2, characterized in that doped films are made by also conducting to said open-ended vessel a suitable dopant-precursor material in vapor form at a metered flow rate, whereby doped films of uniform and desired dopant concentration are obtained.

4. A method as defined in claim 3, characterized in that the dopant used is copper, whereby films particularly sensitive to infrared radiation of desired wavelength are obtained.

5. A method as defined in claim 3, characterized in that the dopant used is an element selected from the group consisting of silicon, tin and germanium, whereby films of desired lengthened photoresponse time are obtained.

6. Apparatus for making glassy chalcogenide films of material selected from the group consisting of the selenides and tellurides of arsenic and antimony, said apparatus comprising, in combination, a source of a first substance comprising a compound composed of hydrogen and an element selected from the group consisting of selenium and tellurium, a source of a second substance comprising a compound composed of hydrogen and an element selected from the group consisting of arsenic and antimony, an open-ended vessel having an upstream end and a downstream end, conduit means that contain flow-regulation means for conducting said first and second substances from their sources to said upstream end of said vessel, heating means surrounding said vessel and operative to bring said substances to a temperature sufficiently elevated to cause chemical reaction between them, means in the vicinity of said downstream end of said vessel for receiving a workpiece upon which a film is to be provided, and a hood for removing gases issuing from said downstream end of said vessel.

7. Apparatus as defined in claim 6, characterized in that said combination further comprises a source of dopant-precursor material in vapor form, and conduit means that contain flow-regulation means for conducting said dopant-precursor material at a metered rate to said upstream end of said vessel.

* * * * *